(12) United States Patent
Otala et al.

(10) Patent No.: US 7,200,321 B2
(45) Date of Patent: Apr. 3, 2007

(54) METHOD AND APPARATUS FOR CREATING AN EXPANDED FUNCTIONALITY DIGITAL VIDEO DISC

(75) Inventors: Tapani Otala, San Jose, CA (US); Eric Vannier, Fremont, CA (US)

(73) Assignee: TiVo Inc., Alviso, CA (US)

( * ) Notice: Subject to any disclaimer, the term of this patent is extended or adjusted under 35 U.S.C. 154(b) by 202 days.

(21) Appl. No.: 10/420,371

(22) Filed: Apr. 21, 2003

(65) Prior Publication Data

US 2003/0219227 A1    Nov. 27, 2003

Related U.S. Application Data

(60) Provisional application No. 60/374,101, filed on Apr. 19, 2002.

(51) Int. Cl.
*H04N 5/91* (2006.01)
*H04N 7/173* (2006.01)

(52) U.S. Cl. .................... 386/69; 386/69; 386/70; 386/95; 386/125; 725/109

(58) Field of Classification Search ............ 386/69, 386/95, 33, 1, 4, 45, 70, 125, 126, 52, 58, 386/105, 106, 96; 725/109
See application file for complete search history.

(56) References Cited

U.S. PATENT DOCUMENTS 6,263,152 B1 * 7/2001 Hisatomi et al. .............. 386/70
6,317,885 B1 * 11/2001 Fries .......................... 725/109
6,363,212 B1 * 3/2002 Fujinami et al. ............. 386/104

(Continued)

OTHER PUBLICATIONS

International Bureau, "Notification Concerning Transmittal of Copy of International Preliminary Report on Patentability (Chapter I of the Patent Cooperation Treaty)." PCT/US2004/010913, 5 pages, dated Nov. 3, 2005.
Current Claims, PCT/US2004/010913, 5 pages.

(Continued)

*Primary Examiner*—Thai Tran
*Assistant Examiner*—Jamie J Vent
(74) *Attorney, Agent, or Firm*—Kirk D. Wong; Hickman Palermo Truong & Becker LLP

(57) ABSTRACT

A method and apparatus for creating an expanded functionality digital video disc (DVD) creates an enhanced DVD with index tables for the program streams on the DVD. Index tables point to key locations in an MPEG program stream with each entry in the index table set to point to a group of pictures (GOP) header in the MPEG stream. The invention can select GOP headers at predefined intervals, semi-random intervals, or at key locations. The invention creates an index table either during storage of a program stream on a hard disk, during a scan of program material already stored on a local hard disk, or while program material is being read out of the hard disk and written to a DVD. The invention adds a new directory to the DVD structure and writes the index table(s) for the stream(s) into the directory. The new directory and its content are only recognized by invention-enabled DVD players and DVRs. Each media stream file in the VIDEO_TS and AUDIO_TS directories has a corresponding index table file in the new directory. Alternatively, the index table files could be stored in the respective VIDEO_TS and AUDIO_TS directories. When an enhanced DVD created by the invention is inserted into a invention-aware DVR or DVD player, the index table files on the DVD are utilized to enable smooth special effects functionality.

18 Claims, 8 Drawing Sheets

U.S. PATENT DOCUMENTS

2002/0088011 A1*  7/2002  Lamkin et al. ............. 725/142
2002/0131767 A1*  9/2002  Auwens et al. ............... 386/95
2003/0016951 A1*  1/2003  Jakel et al. ................. 386/125
2003/0138236 A1*  7/2003  Um et al. ..................... 386/69
2004/0013406 A1*  1/2004  Barton et al. ................. 386/69

OTHER PUBLICATIONS

International Search Report and Written Opinion, International Application No. PCT/US04/10913 dated Sep. 2005, (8 pgs)—attached.

Current Claims in PCT application No. PCT/US04/1913 (7 pgs)—attached.

* cited by examiner

METHOD AND APPARATUS FOR CREATING AN EXPANDED FUNCTIONALITY DIGITAL VIDEO DISC

CROSS REFERENCE TO RELATED APPLICATIONS

This application claims benefit of U.S. Provisional Patent Application Ser. No. 60/374,101, filed on 19 Apr. 2002.

BACKGROUND OF THE INVENTION

1. Technical Field

The invention relates to the format of digital video discs (DVD). More particularly, the invention relates to the expansion of functionality of DVD content for compatible digital video recorders and DVD players.

2. Description of the Prior Art

Digital Video Discs or DVDs, have become as popular as VCR tapes. In a short time, DVD players may replace VCRs. Sales of DVD players have been increasing dramatically each year. The manufacturers of DVDs envision the DVD to replace not only VCR tapes, but CDs, laserdiscs, and video game cartridges.

Currently, DVDs offer a platform that can store up to 15.9 GBs of video and audio data on a single disc. However, a typical recordable DVD can only store approximately 4.7 GBs of data.

More recently, digital video recorders (DVR) have emerged in the marketplace. One example is U.S. Pat. No. 6,233,389 owned by the Applicant. There are a number of technology trends in force today that are continuing to expand the opportunities for DVR functionality. These trends, whose initial existence directly led to the invention of the DVR, are: the increasing density of gates on semiconductor media; and the increasing density of magnetic storage on hard drive platters.

As content broadcasters transition to pure digital broadcasts, the entire pathway from the broadcast station to the viewer is turning digital. DVRs are on the forefront of offering digital storage and display solutions to the viewer. DVRs offer the viewer increased control of the storage and playback of recorded broadcast programs. The user has the ability to pause and rewind through live broadcast programs which was never feasible using VCRs.

Even though the hard disks in a DVR can be very large (hundreds of gigabytes), the ability to backup and play stored program material using a DVD player/recorder was not considered until U.S. Pat. No. 6,233,389. This combination offers the DVR user the advantage of creating a large library of program material stored on DVDs.

However, one problem arises when playing DVDs that are formatted using the DVD standard. When a DVD is played, it is very difficult to perform special effects such as fast forward and rewind through the program material with the same granularity as with program material stored on a DVR. Moreover, it is impossible to go to arbitrary positions within the DVD content without having to perform multiple reads of the content. Each read contributes a high latency.

To perform the same type of DVR special effects on a standard DVD player requires expensive reads of sections of the DVD disc and the granularity would not be up to the standards of a DVR.

It would be advantageous to provide a method and apparatus for creating an expanded functionality digital video disc (DVD) that gives a user the ability to perform fine granularity special effects on DVD program material played on a DVR and a DVD player. It would further be advantageous to provide a method and apparatus for creating an expanded functionality digital video disc that carries additional information about the DVD program material that is useful to a DVR.

SUMMARY OF THE INVENTION

The invention provides a method and apparatus for creating an expanded functionality digital video disc (DVD). The invention gives a user the ability to perform fine granularity special effects on DVD program material played on a digital video recorder (DVR) and a DVD player. In addition, the invention provides a DVR with greater DVD program material information when playing an enhanced DVD.

A preferred embodiment of the invention creates an enhanced DVD with index tables for the program streams on the DVD. Index tables point to key locations in an MPEG program stream. Each entry in the index table is set by the invention to point to beginning of a group of pictures (GOP) header in the MPEG stream. The invention can select GOP headers at predefined intervals, semi-random intervals, or at key locations.

The invention creates an index table either during storage of a program stream on a hard disk, during a scan of program material already stored on a local hard disk, or while program material is being read out of the hard disk and written to a DVD.

The DVD is organized using the Universal Disk Format (UDF) bridge format. The invention creates DVD standard navigation and control information and writes the information to the DVD. The invention adds a new directory to the DVD structure. The directory can be any name that is not reserved. The invention creates the new directory on the DVD and writes the index table(s) for the stream(s) into the directory.

The new directory and its content are only recognized by invention-enabled DVD players and DVRs. Each media stream file in the VIDEO_TS and AUDIO_TS directories has a corresponding index table file in the new directory. Alternatively, the index table files could be stored in the respective VIDEO_TS and AUDIO_TS directories.

When an enhanced DVD created by the invention is inserted into a invention-aware DVD player, the DVD player utilizes the index table files on the DVD to enable full special effects functionality. The index table gives the DVD player full random access to the enhanced DVD to perform special effects on the program material. Smooth fast forward and reverse special effects are achieved by grabbing frames addressed through the index table.

The invention provides a seamless user experience between DVR content and DVD content on a combination device that incorporates both features. An invention-aware DVR reads an enhanced DVD and utilizes the index table files on the DVD to perform special effects functionality that are equivalent to special effects performed on streams stored on the hard disk of the DVR.

A further enhancement to the invention is for a DVR to store Electronic Program Guide (EPG) metadata for each captured TV broadcast program onto the enhanced DVD.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a method and apparatus for creating an expanded functionality digital video disc (DVD). A system according to the invention gives a user the ability to perform fine granularity special effects on DVD program material played on a digital video recorder (DVR) and DVD player. The invention additionally provides a DVR with greater DVD program material information when playing an enhanced DVD.

The DVD standard provides "random" access of a DVD as long as the accessed location is on a chapter boundary. Any accesses that require a finer granularity than the chapter boundary creates a problem. A Navigation Table is provided that allows the DVD player to access locations at −120 seconds and +120 seconds from the current position and other intermediary points within that interval (e.g., −60, −30, −7.5, +7.5, +30, +60). The table does not contain indexes between the sub-intervals. To find a location that is in between the 120 second frame sequence, it is necessary to interpolate the position and read each navigation pack to find the desired point in the DVD program material. Further, to randomly access a location on the DVD requires 100 ms to 200 ms. Having to perform multiple reads to find a location contributes to a large time delay.

As the above illustrates, with the current DVD format, it is difficult to smoothly traverse DVD content randomly and backwards using a DVD player. This makes it very difficult to smoothly perform special effects such as arbitrary seconds replay or a skip to arbitrary time code feature.

A preferred embodiment of the invention solves the above problem by enhancing DVDs with additional content that aid in navigating the recorded program material at arbitrary speeds both backward and forward. This is done by incorporating indexing onto the DVD media that provides full random access to the DVD, thereby enabling invention-aware DVRs and DVD players to perform random access positioning faster and more precisely than standard DVD players and to offer smooth backward and forward navigation of such enhanced DVDs.

Figure 1:
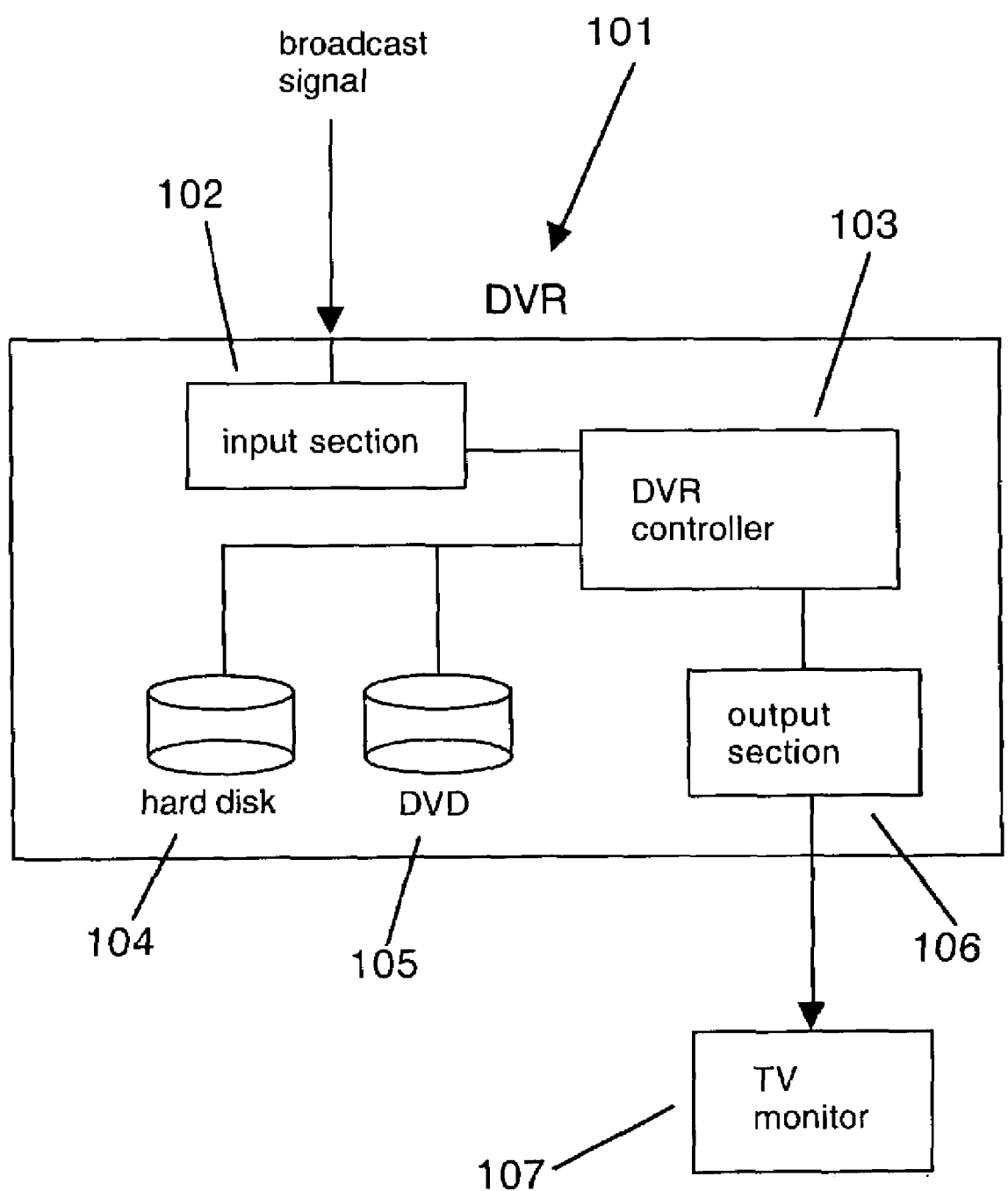
FIG. 1 is a block schematic diagram of a digital video recorder (DVR) according to the invention.

Referring to FIG. 1, an exemplary digital video recorder (DVR) 101 with an input section 102, DVR controller 103, and an output section 106 is shown. Storage of program material occurs on a local hard disk 104 and a DVD player/recorder 105.

Such a DVR is described in U.S. Pat. No. 6,233,389 owned by the Applicant and incorporated herein by reference and U.S. patent application Ser. No. unassigned, entitled Digital Video Recorder System with an Integrated DVD Recording Device, also owned by the Applicant and incorporated herein by reference.

The input section 102 accepts television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). DBS, DSS and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. The input section 102 produces MPEG streams.

An MPEG-2 transport multiplex supports multiple programs in the same broadcast channel, with multiple video and audio feeds and private data. The input section 102 tunes the channel to a particular program, extracts a specific MPEG program out of it, and feeds it to the rest of the system. Analog TV signals are encoded into a similar MPEG format such that the remainder of the system is unaware of how the signal was obtained. Additional information may be modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals are decoded by the input section and passed to the other parts of the system as if they were delivered via an MPEG-2 private data channel.

The DVR controller 103 handles the streams coming from the input section 102 and directs the streams to the hard drive 104, the DVD player/recorder 105, and the output section 106. Input streams are converted to an MPEG stream by the input section 102 and sent to the DVR controller 103. The DVR controller 103 buffers the MPEG stream into memory. It then performs two operations if the user is watching real time TV: the stream is sent to the output section 106 and it is written simultaneously to the hard disk 104. Otherwise it stores the MPEG stream on the hard disk 104.

As the DVR controller 103 stores the MPEG stream onto the hard disk 104, it creates an index table. The DVR controller 103 reads the MPEG stream and records the location of each elementary stream element (e.g., I, P, and B frames) and most notably the beginning of every group of pictures (GOP) header and the closest time stamp in an index table. It is possible to jump to any arbitrary time, using the index table, by comparing all of the time stamps available, finding the two timestamps that are the closest to the target, and doing a linear interpolation between them to find out where to jump to in the stream should the index table not contain the exact jump point location for the desired time. This method is used when a jump to an arbitrary point in the file is performed.

If it is required to jump relatively from the point at which the stream is currently playing, the linear interpolation gives a value to jump relatively from that point. Doing so ensures that the imprecision of the positioning will not make a jump forward go backward or simply go forward by too much or little. This latter method is used for fast forward, or rewind special effects, for example. This is also used when the absolute time that the system is supposed to jump to is close to the current point.

The output section 106 takes MPEG streams as input and produces an analog TV signal to a TV monitor 107 according to the NTSC, PAL, or other required TV standards or a digital signal for a digital monitor 107. The output section 106 contains an MPEG decoder, On-Screen Display (OSD) generator, analog TV encoder, digital display encoder (e.g., DVI, HDMI, etc.), and audio logic. The OSD generator allows the DVR controller 103 to supply images which will be overlaid on top of the resulting output signal.

The DVR controller 103 allows a user to playback program material stored on the hard disk 104 and also stored on a DVD inserted into the DVD player/recorder 105. The DVD player/recorder 105 records program material stored on the hard disk 104 onto a recordable DVD.

Figure 2:
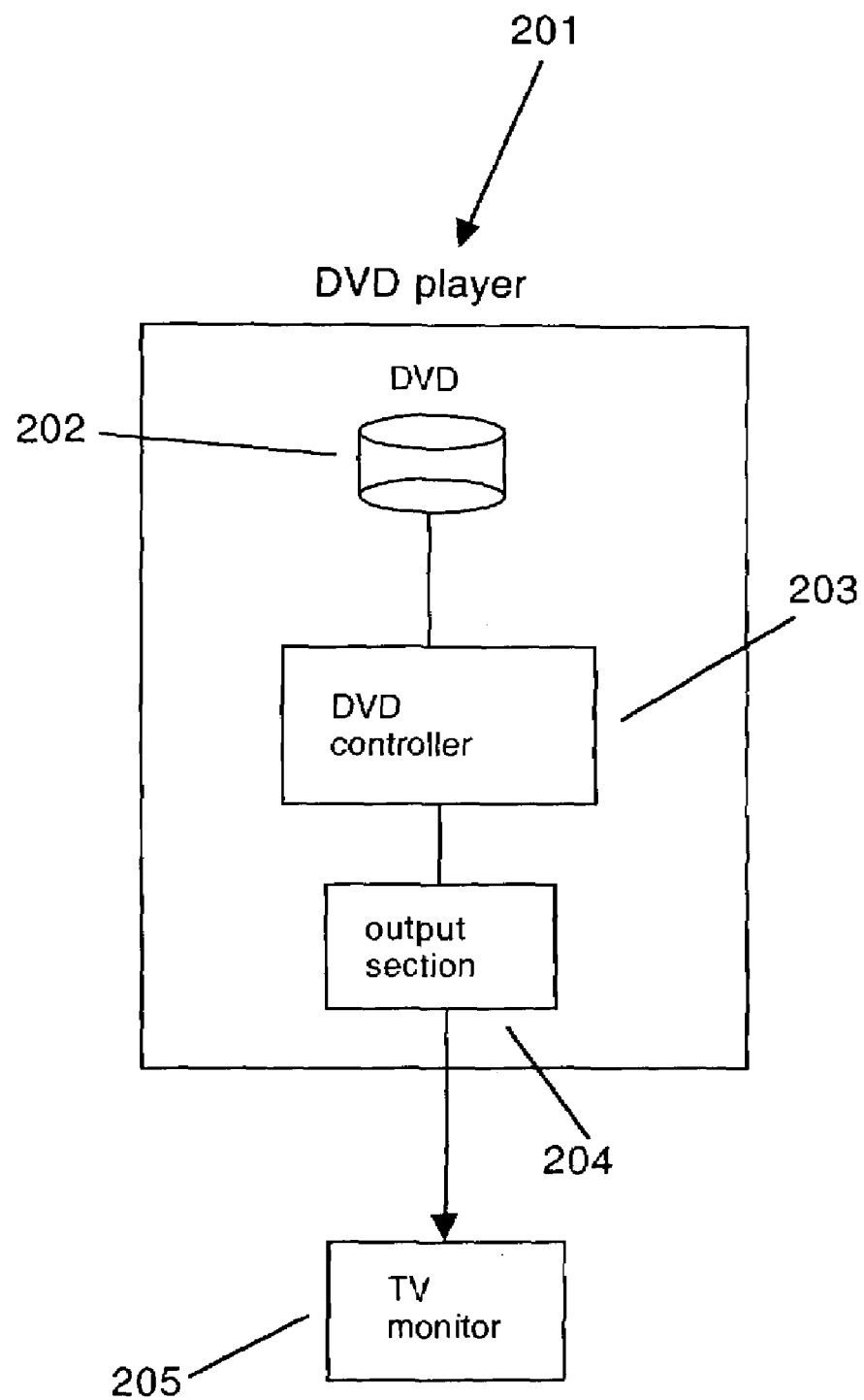
FIG. 2 is a block schematic diagram of a digital video disc (DVD) player according to the invention.

With respect to FIG. 2, a DVD player 201 accepts a pre-recorded DVD 202. The DVD controller 203 reads the pre-recorded program material from the DVD 202. The DVD controller 203 allows the user to navigate through the DVD, play program material, and to perform fast forward and rewind functions.

A user inserts a DVD 202 into the DVD player 201. The user selects the program material to be viewed via the DVD controller 203. The DVD controller 203 locates the program material on the DVD 202 and extracts and streams the MPEG program video and audio from the DVD 202 to the output section 204. The output section 204 converts the MPEG streams to an analog TV signal to the TV monitor 205. The user views the program material via the TV monitor 205.

When one compares a DVR and a DVD player side-by-side, there is no apparent quality difference in the picture presented to the user. This is because both the DVR and the DVD player both follow the MPEG standard. The difference is in the ability to navigate through the program material. The DVR smoothly transitions between frames of the program material while performing special effects on the material, e.g., fast forward, reverse, play, pause, fast/slow play, indexing, and fast/slow reverse play. As noted above, the DVD player cannot make smooth transitions between frames of the program material because the DVD player is not able to timely access the DVD material.

One preferred embodiment of the invention brings the DVD player on par with the DVR.

Figure 3:
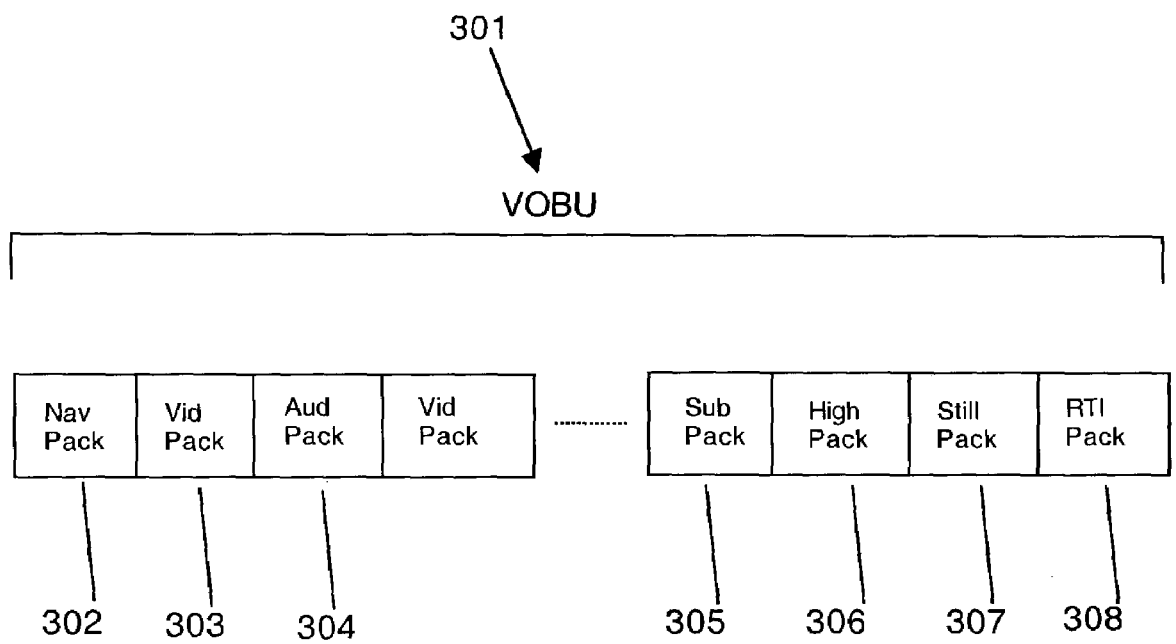
FIG. 3 is a block schematic diagram of an DVD standard video object unit (VOBU) data stream and its packets according to the invention.

Referring to FIG. 3, DVD-Video and DVD-Audio information is laid out on the DVD in Video Object Units (VOBU). A VOBU 301 for a DVD-video format can have a navigation packet 302, one or more video packets 303, one or more audio packets 304, and one or more subpicture packets 305. DVD-audio formats use the highlight packets 306, still packets 307, and RT text packets 308. A VOBU 301 does not always contain video.

Navigation packets 302 contain information that determines how the physical data is accessed. The video 303 and audio 304 packets carry the video and audio content in recording order. Subpicture information 305 overlays the video content for indicating subtitles, captions, menus, etc.

The video VOBUs are compliant with the MPEG program stream standard. VOBUs that contain video are organized as an MPEG group of pictures (GOP).

The navigation packs that enable interactive navigation of the DVD content require a substantial amount of effort during the DVD authoring process. The invention does not affect the standard layout of the VOBU streams, but rather, works in conjunction with and takes advantage of the DVD standard.

The invention authors a DVD by:
1) Preparing video & audio content The content may already exist, or it may be captured content from an analog or digital program source, such as terrestrial antenna, analog cable TV feed, digital cable TV feed, or digital satellite TV feed.
2) Building index table(s) Either during the capturing process or during the DVD authoring process, generate index table(s) that provide pointers to all key locations in the media stream(s).
3) Creating the enhanced DVD Create a UDF file system.

A benefit of the invention is that it requires no human intervention and can be used on arbitrary off the air captured media streams. It can also be used on direct real-time capture-to-archive transfer of content.

Figure 4:
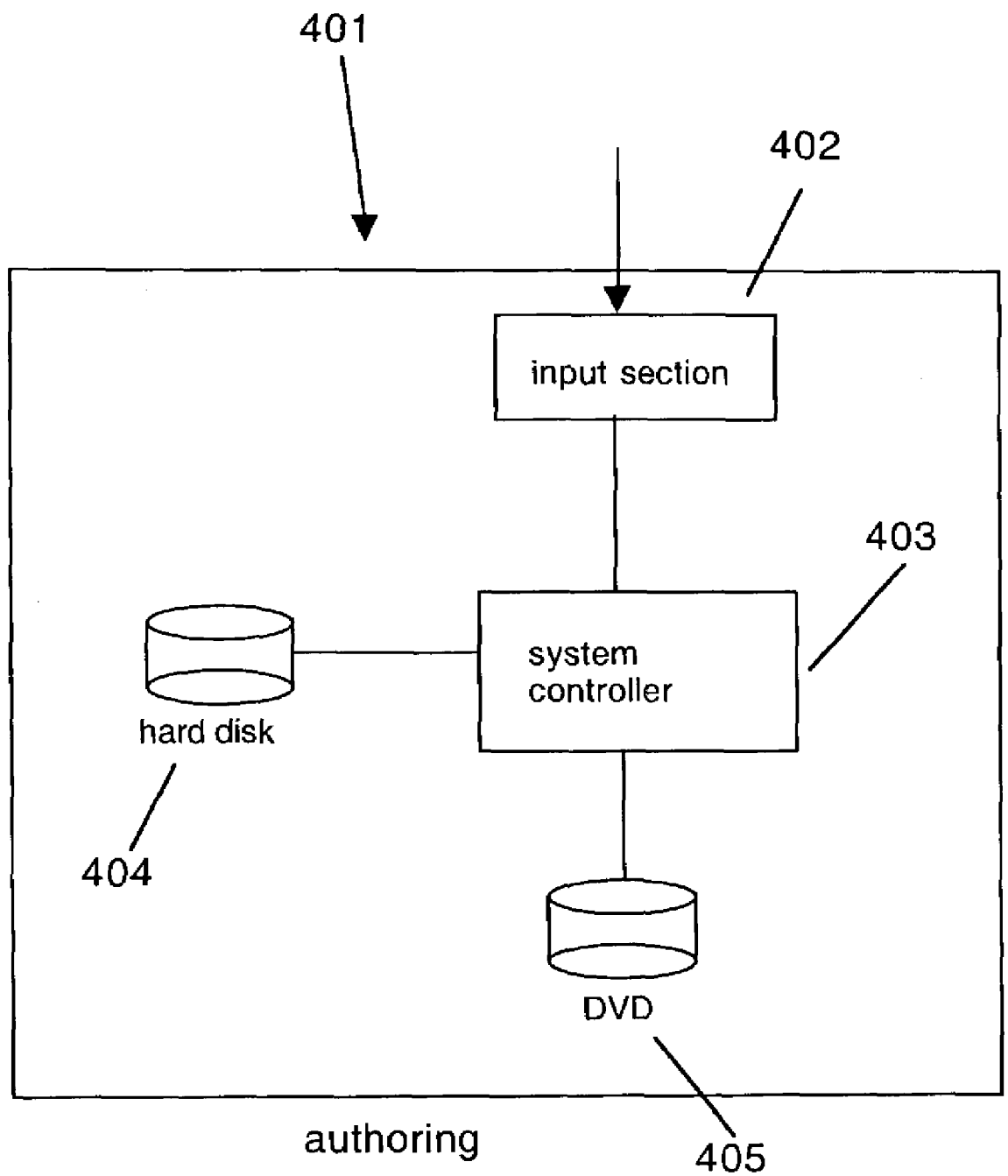
FIG. 4 is a block schematic diagram of an enhanced DVD authoring system according to the invention.
Figure 5:
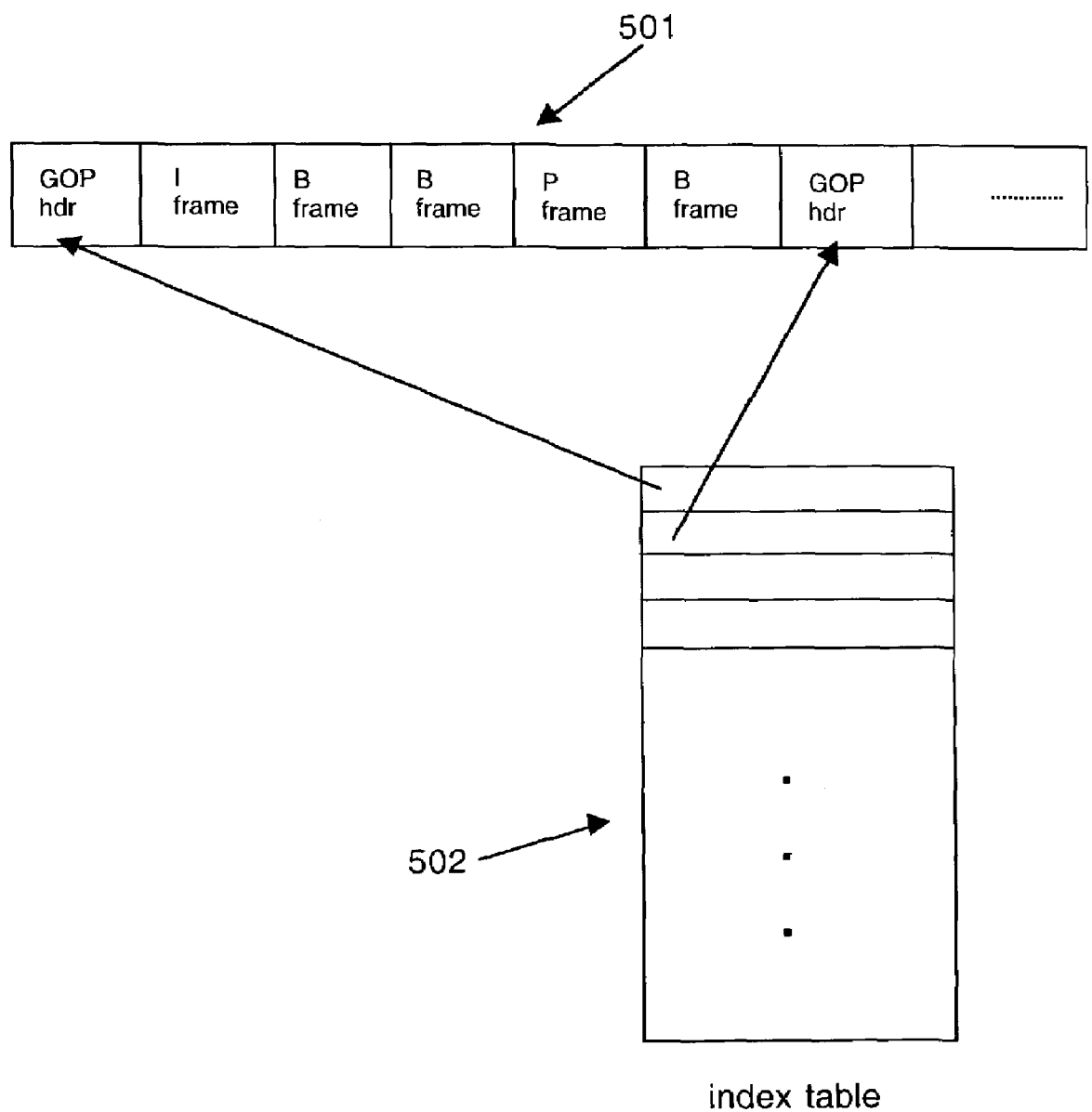
FIG. 5 is a block schematic diagram of an index table created by the invention that points to key locations in an MPEG stream according to the invention.

With respect to FIGS. 4 and 5, a typical authoring system 401 contains many of the components of a DVR. Therefore, a DVR can author DVDs in the same manner as an authoring system, but has the added benefit of recording broadcast program material onto a DVD.

The program material to be authored enters the authoring system 401 through the input section 402. The system controller 403 stores the program material in MPEG format onto the hard disk 404.

It is easy to see from above, that a DVR has the ability to navigate within a stream at a much finer granularity than a standard DVD player. The authoring system 401 stores the program material on the hard disk 404 in the same manner as a DVR and therefore has the ability to address the program material at the same granularity as a DVR.

The system controller 403 creates index tables 502 for the program material stored on the hard disk 404 in the same manner as described above for the DVR. The index tables 502 point to key locations in the program's MPEG stream. Each entry in the index table 502 is set by the system controller 403 to point to a GOP header in the program stream 501 and to include a time stamp.

The GOP headers selected by the system controller 403 are dependent upon the system setup. The system can select GOP headers at predefined intervals, semi-random intervals, or at key locations. Generally, predefined intervals are used.

The system controller 403 sets up the index table 502 either during storage of the program material on the hard disk 404, during a scan of the program material already stored on the hard disk 404, or while the program material is being read out of the hard disk 404 and written to the DVD 405.

Using the first approach, as the system controller 403 accepts streams from the input section 402, the system controller 403 reads the incoming MPEG streams and determines the addresses of the GOP header frames that it wants to store. The system controller 403 places each address as it is determined into a location in the index table 502 and stores the incoming stream 501 on the hard disk 404. Once the entire program material stream has been stored on the hard disk 404, the system controller stores the completed index table 502 on the hard disk 404.

The second approach allows the system controller to scan the program material stream that is already stored on the hard disk 404. It also allows the system controller to post-process a DVD that has been pre-recorded. The system controller 403 scans the stream 501 on the hard drive 404 or DVD 405. As the stream is scanned, the system controller 403 creates the index table 502 for the stream. When the scan is completed, the system controller 403 stores the index table 502 on the hard disk 404 and/or writes the index table 502 to the pre-recorded DVD 405.

In the final approach, the system controller 403 reads a program stream off of the hard disk 404 and writes the stream to the DVD 405. While the system controller 403 reads the stream, it creates the index table 502, pointing the entries in the index table 502 to locations in the stream 501. After the stream is written to the DVD 405, the system controller writes the index table 502 to the DVD 405.

Figure 6:
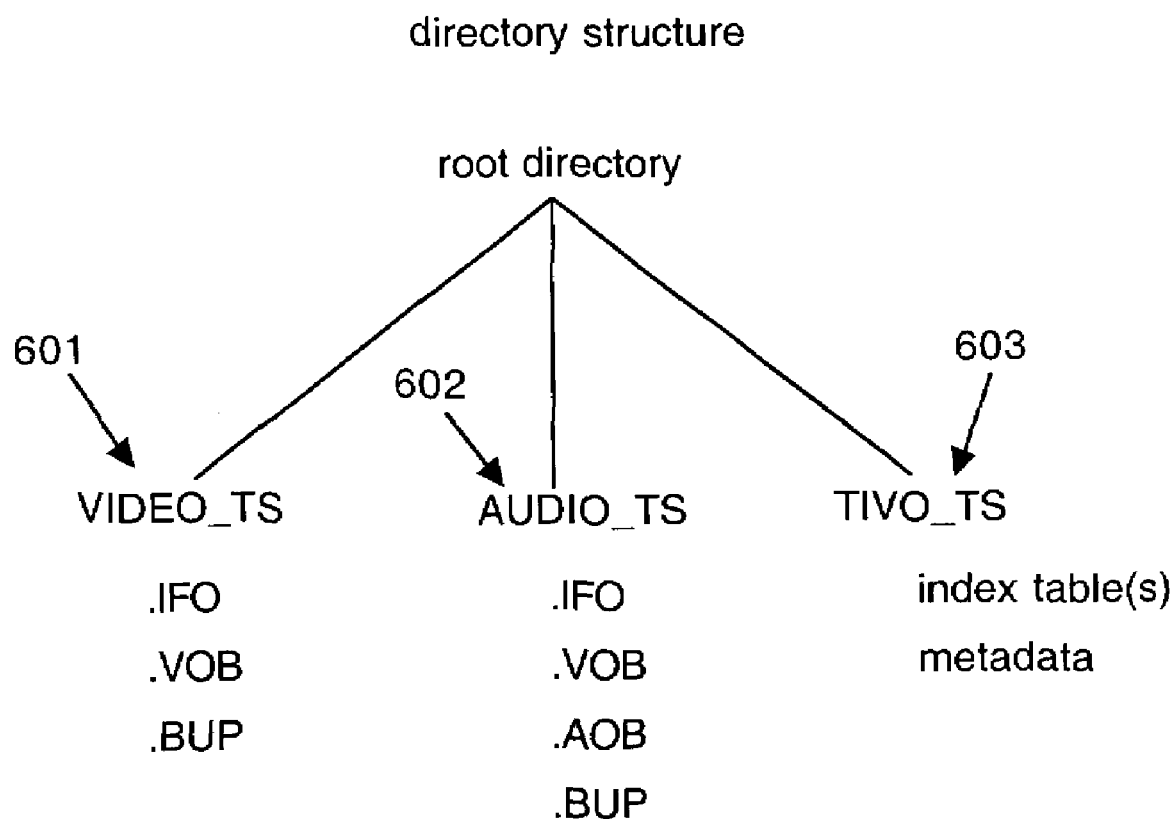
FIG. 6 is a schematic diagram of part of a standard DVD directory structure according to the invention.

With respect to FIGS. 4 and 6, the authoring system 401 needs to create an enhanced DVD 405 that follows the DVD standard. The DVD itself is organized using the Universal Disk Format (UDF) bridge format. The system controller 403 creates the DVD standard navigation and control information and writes the information to the DVD 405. The system controller 403 also writes .VOB (video object file), .AOB (audio object file), .IFO (information file object), and .BUP (backup file) files to a VIDEO_TS directory 601 or an AUDIO_TS directory 602. The VIDEO_TS directory 601 is for DVD Video or DVD Audio discs with video. The AUDIO_TS directory 602 is for DVD-audio only discs.

The invention adds a new directory 603 to the DVD structure. The directory can be any name that is not reserved, for example, TIVO_TS. The system controller 403 creates the new directory 603 on the DVD 405. It then writes the index table(s) 502 for the stream(s) into that directory 603.

The new directory 603 and its content are only recognized by invention-enabled DVD players and DVRs. Each media stream file in the VIDEO_TS 601 and AUDIO_TS 602 directories has a corresponding index table file in the new directory 603. Alternatively, the index table files could be stored in the respective VIDEO_TS 601 and AUDIO_TS 602 directories.

Referring again to FIG. 2, when an enhanced DVD 202 created by the invention is inserted into a invention-aware DVD player 201, the DVD controller 203 utilizes the index table files on the DVD 202 to enable full special effects functionality. The index table gives the DVD player 201 full random access to the enhanced DVD 202 to perform special effects on the program material. The DVD controller 202 simply refers to the index table and jumps to the addresses in the index table or uses the linear interpolation method as described above for jump points not in the index table. Smooth fast forward and reverse special effects are achieved by grabbing frames addressed through the index table. Any type of jump navigation (e.g., instant replay of the last ten seconds) is also achieved via the index table. A non invention-aware DVD player will play an enhanced DVD as it would a normal DVD.

One skilled in the art will readily appreciate that the invention's index table allows many types of methods to be used to locate frames within the MPEG stream. Further, one skilled in the art will readily appreciate that, although the index table described contains a timestamp and frame pointer, information can be included or replaced to supplement desired tasks on a DVR or DVD player.

The invention provides a seamless user experience between DVR content and DVD content on a combination device that incorporates both features.

Referring again to FIG. 1, an invention-aware DVR 101, reads an enhanced DVD 105. The DVR controller 103 utilizes the index table files on the DVD 105 to perform special effects functionality that is equivalent to special effects performed on streams stored on the hard disk 104. The DVR controller 103 refers to the index table and uses its information as described above. Smooth fast forward, reverse, frame step, and random positioning special effects are achieved by grabbing frames addressed through the index table.

A further enhancement to the invention is to store Electronic Program Guide (EPG) metadata for each captured TV broadcast program onto the enhanced DVD. This is used by the DVR or DVD player to enable better searching of recorded content. U.S. patent application Ser. No. 09/422,139, also owned by the Applicant and incorporated herein by reference describes the type of object information (metadata) that can be used by the invention.

Figure 7:
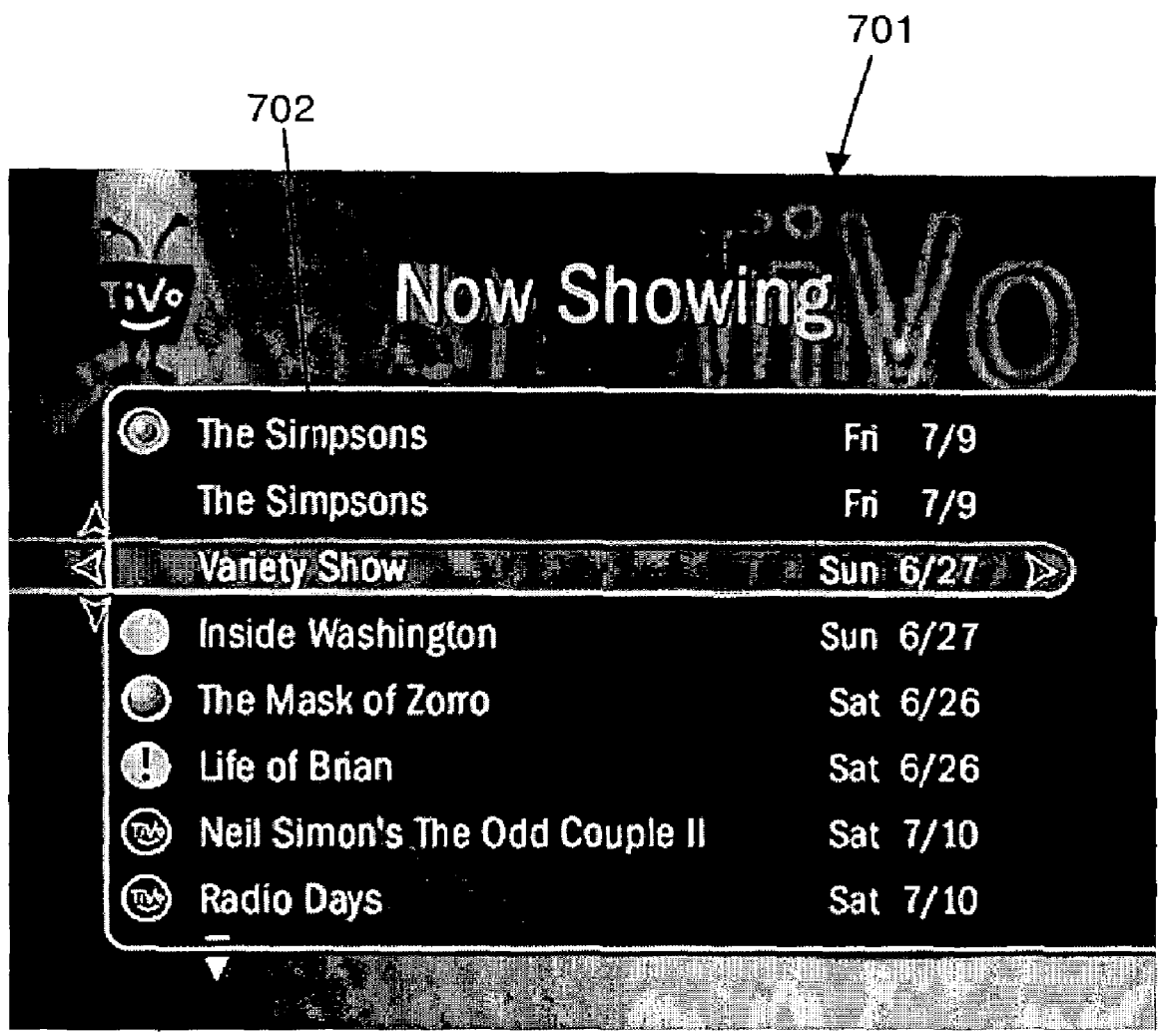
FIG. 7 is a diagram of a user interface screen showing the program material stored on an enhanced DVD according to the invention.

Referring to FIG. 7, metadata is used to display program information to a user, allow the user to search program material based on program attributes such as actor, genre, director, etc., and to list programs stored on the DVD. The metadata can be used to display a list of program material stored on the DVD 701. The names of the program 702 is stored in the metadata.

Figure 8:
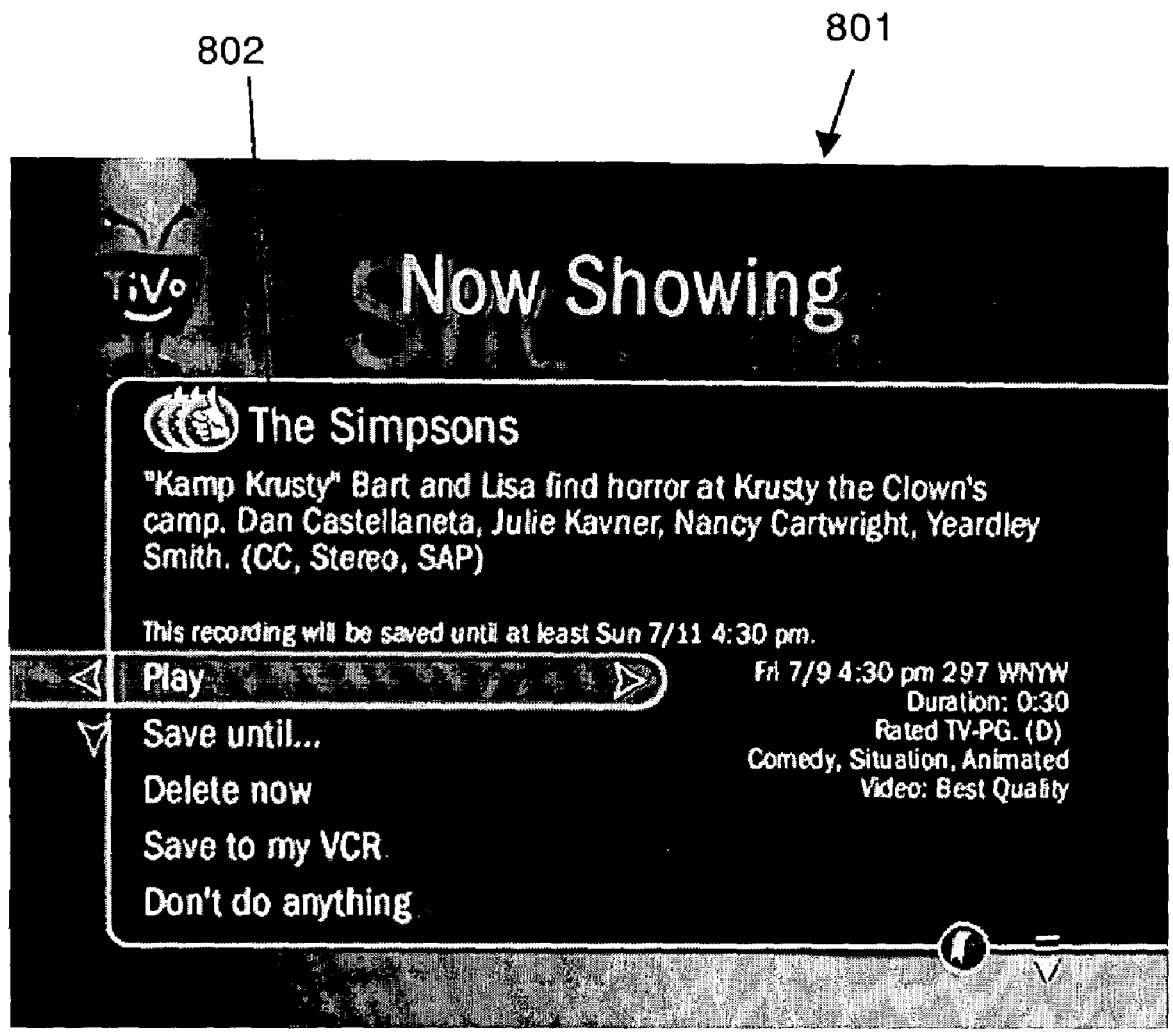
FIG. 8 is a diagram of a user interface screen showing a detailed description of a program stored on an enhanced DVD according to the invention.

Referring to FIG. 8, a program material's metadata can provide the DVD player or DVR with enough information to display detailed program information 801 such as the program's textual content summary 802.

Another preferred embodiment of the invention allows a DVR to perform fine-granularity special effects on a read-only DVD. The DVR scans a read-only DVD and creates a corresponding index table that is temporarily stored on the DVR's hard disk. The DVR references the index table when the user plays the DVD. The DVR can build a library of index tables that are referenced whenever the user plays a DVD that has a stored index table in the library. This saves the DVR the time required to reproduce an index table(s) that have been previously created.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process for creating and using an enhanced digital video disc (DVD), comprising the steps of:
    reading a digital program material stream;
    creating an index table;
    wherein entries in said index table point to specific frames within said digital program material stream;
    wherein said creating step selects said specific frames at predefined intervals;
    writing said digital program material stream onto a DVD according to a DVD standard;
    writing said index table onto said DVD;
    creating a new directory on said DVD that is not a DVD standard directory; and
    wherein said index table is written into said directory.

2. The process of claim 1, further comprising the step of:
    storing metadata associated with said program material stream in said directory; and
    wherein said metadata contains information regarding content of said program material stream.

3. The process of claim 1, wherein said index table is written into a DVD standard VIDEO_TS directory on said DVD.

4. The process of claim 1, wherein said index table is written into a DVD standard AUDIO_TS directory on said DVD.

5. The process of claim 1, further comprising the step of:
    storing said digital program material stream on a hard disk.

6. The process of claim 5, wherein said creating step creates said index table as said digital program material stream is stored onto said hard disk.

7. The process of claim 5, wherein said creating step creates said index table while it scans said digital program material stream stored on said hard disk.

8. The process of claim 1, wherein said creating step creates said index table as said digital program material stream is written onto said DVD.

9. The process of claim 1, further comprising the steps of:
reading an index table from said DVD;
playing a digital stream on said DVD to a user;
receiving user commands for said playing step to perform special effects during playback of said digital stream that includes any of: variable rate fast forward and rewind, frame step, pause, and play functions; and
wherein said playing step uses said index table to reference frames within said digital stream to perform said special effects.

10. An apparatus for creating and using an enhanced digital video disc (DVD), comprising:
a module for reading a digital program material stream;
a module for creating an index table;
wherein entries in said index table point to specific frames within said digital program material stream;
wherein said creating module selects said specific frames at predefined intervals;
a module for writing said digital program material stream onto a DVD according to a DVD standard;
a module for writing said index table onto said DVD;
a module for creating a new directory on said DVD that is not a DVD standard directory; and
wherein said index table is written into said directory.

11. The apparatus of claim 10, further comprising:
a module for storing metadata associated with said program material stream in said directory; and
wherein said metadata contains information regarding content of said program material stream.

12. The apparatus of claim 10, wherein said index table is written into a DVD standard $VIDEO_{13}$ TS directory on said DVD.

13. The apparatus of claim 10, wherein said index table is written into a DVD standard AUDIO_TS directory on said DVD.

14. The apparatus of claim 10, further comprising:
a module for storing said digital program material stream on a hard disk.

15. The apparatus of claim 14, wherein said creating module creates said index table as said digital program material stream is stored onto said hard disk.

16. The apparatus of claim 14, wherein said creating module creates said index table while it scans said digital program material stream stored on said hard disk.

17. The apparatus of claim 10, wherein said creating module creates said index table as said digital program material stream is written onto said DVD.

18. The apparatus of claim 10, further comprising:
a module for reading an index table from said DVD;
a module for playing a digital stream on said DVD to a user;
receiving user commands for said playing module to perform special effects during playback of said digital stream that includes any of: variable rate fast forward and rewind, frame step, pause, and play functions; and
wherein said playing module uses said index table to reference frames within said digital stream to perform said special effects.

* * * * *